United States Patent [19]
Hodson et al.

[11] Patent Number: 5,669,690
[45] Date of Patent: Sep. 23, 1997

[54] MULTIMEDIA FIELD EMISSION DEVICE PROJECTION SYSTEM

[75] Inventors: Lester L. Hodson, McKinney; Charles E. Primm, Plano, both of Tex.

[73] Assignee: Texas Instruments Incorporated, Dallas, Tex.

[21] Appl. No.: 538,328

[22] Filed: Oct. 3, 1995

Related U.S. Application Data

[63] Continuation-in-part of Ser. No. 324,832, Oct. 18, 1994, abandoned.

[51] Int. Cl.$^6$ .................................................. G03B 21/00
[52] U.S. Cl. ........................... 353/122; 353/31; 353/7
[58] Field of Search ................... 353/122, DIG. 3, 353/7; 313/309, 495

[56] References Cited

U.S. PATENT DOCUMENTS

| | | | |
|---|---|---|---|
| 4,857,799 | 8/1989 | Spindt et al. | 313/495 |
| 4,940,916 | 7/1990 | Borel et al. | 313/306 |
| 5,194,780 | 3/1993 | Meyer | 315/169.3 |
| 5,194,884 | 3/1993 | Parker et al. | 353/122 |
| 5,225,820 | 7/1993 | Clerc | 340/752 |
| 5,337,224 | 8/1994 | Field et al. | 362/84 |
| 5,371,543 | 12/1994 | Anderson | 359/891 |
| 5,477,284 | 12/1995 | Taylor et al. | 353/122 |
| 5,521,660 | 5/1996 | Hodson et al. | 353/122 |

OTHER PUBLICATIONS

Xerox Disclosure Journal, vol. 17, No. 6, 1 Nov. 1992, pp. 411–412, XP000316009 "Stereo Projector For 3-D Presentations", John R. Andrews.

*Primary Examiner*—William Dowling
*Attorney, Agent, or Firm*—Rose Alyssa Keagy; Richard L. Donaldson

[57] ABSTRACT

A projection system is constructed using a field emission device 10. A single monochrome FED 10 can be used with projection system electronics 40 and lens 20 to create a monochrome picture on screen 30. Alternatively, a single monochrome FED 10 can project the proper image through color wheel 150 to create a color image which is projected by a lens 20 onto a separate surface 30. In yet another embodiment, a first FED 10 which projects a red image, a second FED 10 which projects a green image, and a third FED 10 which projects a blue image, and three clear focusing lenses 20 create a full color image on screen 30. In this configuration, if the three lenses 20 are colored red, green and blue, then the three FEDs 10 need only present the image data for each color in black, grey, and white. The FED projection system could also utilize a color FED 10 and a clear focusing lens 20 to create a full color image on screen 30. This full color FED 10 could create its color image by using red, green, and blue phosphor stripes 90 which are energized by its cathode 80 configured with full pixels or sub pixels 160. In another embodiment the FED projection system provides a three-dimensional display image on screen 30. The use of FED 10 facilitates a projection system which has low power consumption, reliable electronics, consumes less space, and interfaces to multimedia input signals 50.

26 Claims, 5 Drawing Sheets

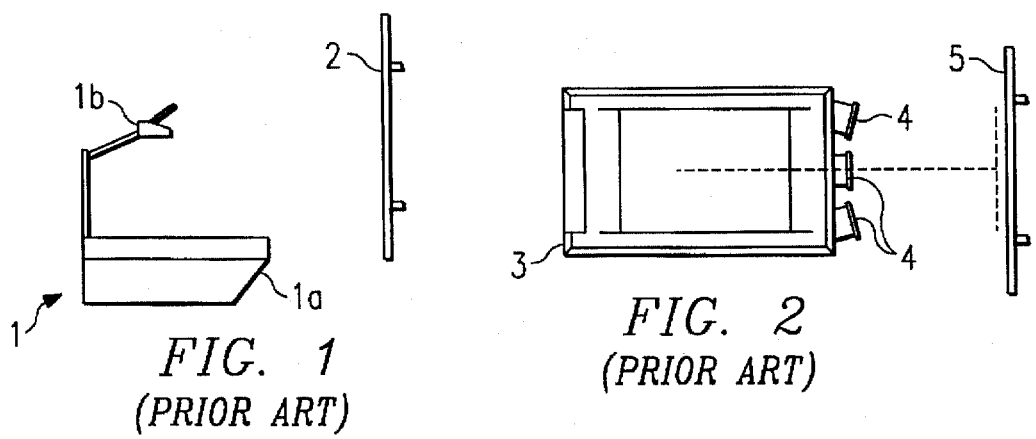
FIG. 1 (PRIOR ART)
FIG. 2 (PRIOR ART)
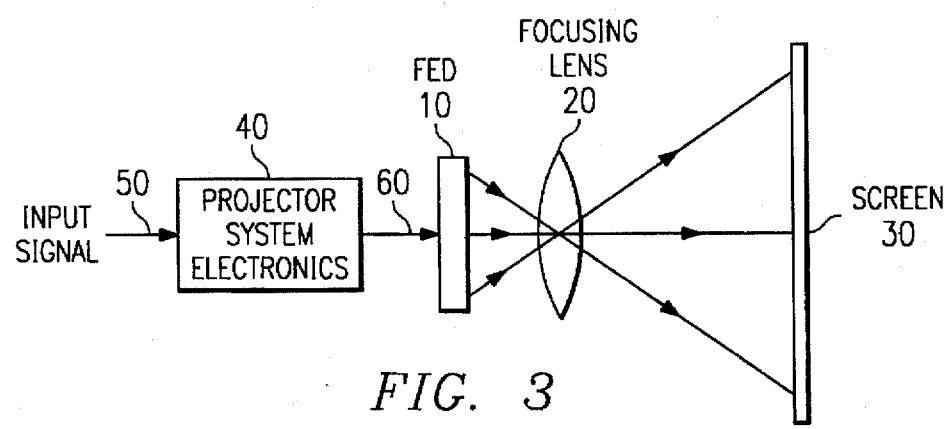
FIG. 3
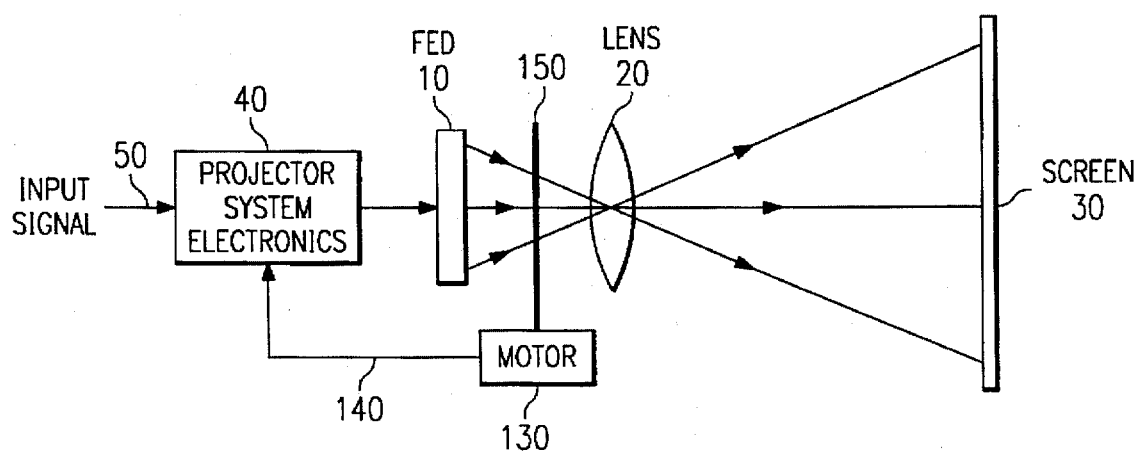
FIG. 6

5,669,690

MULTIMEDIA FIELD EMISSION DEVICE PROJECTION SYSTEM

RELATED APPLICATIONS

This is a continuation-in-part of co-assigned U.S. patent application Ser. No. 08/324,832, filed Oct. 18, 1994 and now abandoned. This Application includes subject matter which is related to U.S. patent application Ser. No. 08/356,809, "Dual Mode Overhead Projection System Using Field Emission Device" (Texas Instruments, Docket No. TI-20036), filed Dec. 15, 1994 now U.S. Pat. No. 5,477,284. This application also includes subject matter which is related to U.S. patent Ser. No. 08/460,376, "Multimedia Field Emission Device Portable Projector," (Texas Instruments, Docket No. TI-19003AA), filed Jun. 2, 1995 now U.S. Pat. No. 5,521,660.

TECHNICAL FIELD OF THE INVENTION

The present invention relates generally to projection devices and, more particularly, to a projection system which uses a field emission display device.

BACKGROUND OF THE INVENTION

As shown in FIG. 1, standard overhead projectors 1, which have been used for many years, project images from a thin transparent plastic sheet to a screen 2. Projector 1 includes a base 1a, housing a light source, and a lens 1b. The transparency is placed on top of base 1a where light emitted from the light source shines through the transparency. Lens 1b directs the image to screen 2. A disadvantage of a standard overhead projection system is that it cannot interface with a computer. The system transmits only the image printed on the transparency. Other disadvantages of standard overhead projection system are that it is too heavy to be easily portable, it produces a lot of heat, and it consumes a lot of power.

Other overhead projector systems, however, are capable of interfacing with computers. One such projector system in use today is the BARCO Data 600 manufactured by BARCO Projection Systems and shown in prior art FIG. 2. The BARCO Data 600 uses three monochrome CRT (Cathode Ray Tube) projection tubes 4, each projecting a red, green or blue image which is converged by use of colored lenses and optics to create a color picture on screen 5. Projection system 3 can be interfaced to a computer (not shown), allowing images displayed on the computer's CRT to also be displayed on screen 5. A primary disadvantage of this type of projection system is that it is large because of the physical depth required by the CRT's. Furthermore, this type of projection system is heavy due to the optics and mechanical packaging required to support a large volume apparatus.

What is needed is a projection system which takes up less space, uses less power, and generates less heat than CRT overhead projection systems, but also interfaces to computers, and is capable of displaying multimedia images.

SUMMARY OF THE INVENTION

A field emission device (FED) is used to create a projection system. The projection system may use a monochrome FED whose image is projected through a focusing lens to a surface separate from the projection system. Alternatively, a single monochrome FED can project the proper image through a color wheel to create a color image which is projected by a focusing lens onto a screen or wall. In yet another embodiment, a first FED which projects a red image, a second FED which projects a green image, and a third FED which projects a blue image, and three clear focusing lenses create a full color image on a screen. In this configuration, if the three lenses are colored red, green and blue, then the three FEDs need only present the image data for each color in black, grey, and white. The FED projection system could also utilize a color FED and a clear focusing lens to create a full color image on a screen. This full color FED could create its color image by using red, green, and blue phosphor stripes in the anode which are energized with a cathode having either full pixels or sub pixels. In yet another embodiment, the FED projection system provides a three-dimensional display on the screen.

BRIEF DESCRIPTION OF THE DRAWINGS

The foregoing features of the present invention may be more fully understood from the following detailed description, read in conjunction with the accompanying drawings, wherein:

FIG. 1 is a prior art standard projection system.

FIG. 2 is a prior art overhead projection system which interfaces to a computer.

FIG. 3 is a first embodiment of a FED projection system.

FIG. 6 is a second embodiment of a FED projection system.

DETAILED DESCRIPTION

Figure 4:
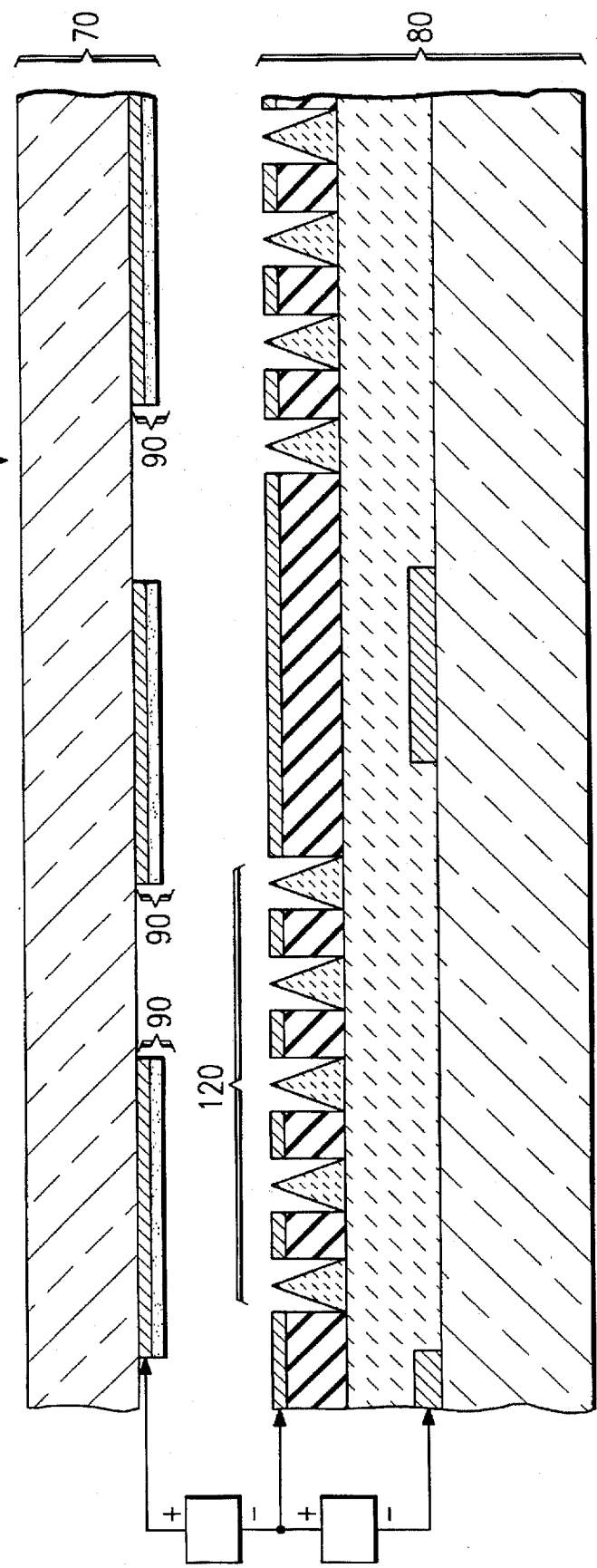
FIG. 4 is a prior art cross-sectional view of a portion of a field emission display having color stripes.

FIG. 3 shows a first preferred embodiment of the present invention. A field emission device (FED) projection system is constructed by creating an image on a monochrome FED 10 which is projected by focusing lens 20 onto a large surface such as a screen or wall 30. A typical FED 10 is explained in more detail below. FED 10 is coupled to projection system electronics 40 which receives an input signal on line 50 and then sends the data and control signals which are necessary to create a FED image to FED 10. Input signal 50 can be provided by any multimedia source such as a TV, a VCR, a satellite, or a computer. System electronics 40 receives the input signal on line 50 and then generates the data and control signals needed by FED 10 to display the correct images.

The luminescence needed to correctly display the images created by FED 10 on a separate surface 30 is provided by the FED 10. The technique for providing the proper luminescence by FED 10 is also explained in more detail below.

A FED flat panel display arrangement is disclosed in U.S. Pat. No. 4,857,799, "Matrix-Addressed Flat Panel Display," issued Aug. 15, 1989, to Charles A. Spindt et al., incorporated herein by reference. This arrangement includes a matrix array of individually addressable light generating means of the cathodoluminescent type having cathodes combined with luminescing means of the CRT type which reacts to electron bombardment by emitting visible light. Each cathode is itself an array of thin film field emission cathodes on a backing plate, and the luminescing means is provided as a phosphor coating on a transparent face plate which is closely spaced to the cathodes.

The backing plate disclosed in the Spindt et al. ('799) patent includes a large number of vertical conductive stripes which are individually addressable. Each cathode includes a multiplicity of spaced-apart electron emitting tips which project upwardly from the vertical stripes on the backing plate toward the face plate. An electrically conductive gate electrode arrangement is positioned adjacent to the tips to generate and control the electron emission. The gate electrode arrangement comprises a large number of individually addressable, horizontal stripes which are orthogonal to the cathode stripes, and which include apertures through which emitted electrons may pass. The gate electrode stripes are common to a full row of pixels extending across the front face of the backing structure, electrically isolated from the arrangement of cathode stripes. The anode is a thin film of an electrically conductive transparent material, such as indium tin oxide, which covers the interior surface of the face plate. Deposited onto this metal layer is a luminescent material, such as phosphor, that emits light when the anode is bombarded by electrons released from the cathode.

The matrix array of cathodes is activated by addressing the orthogonally related cathodes and gates in a generally conventional matrix-addressing scheme. The appropriate cathodes of the display along a selected stripe, such as along one column, are energized while the remaining cathodes are not energized. Gates of a selected stripe orthogonal to the selected cathode stripe are also energized while the remaining gates are not energized, with the result that the cathodes and gates of a pixel at the intersection of the selected horizonal and vertical stripes will be simultaneously energized, emitting electrons so as to provide the desired pixel display.

Other advances in field emission display technology are disclosed in U.S. Pat. No. 4,940,916, "Electron Source with Micropoint Emissive Cathodes and Display Means by Cathodoluminescence Excited by Field Emission Using Said Source," issued 10 Jul. 1990 to Michel Borel et al.; U.S. Pat. No. 5,194,780, "Electron Source with Microtip Emissive Cathodes," issued 16 Mar. 1993 to Robert Meyer; and U.S. Pat. No. 5,225,820, "Microtip Trichromatic Fluorescent Screen," issued 6 Jul. 1993, to Jean-Frédéric Clerc. These patents are also incorporated herein by reference.

The Clerc ('820) patent discloses a trichromatic field emission flat panel display having a first substrate comprising the cathode and gate electrodes, and having a second substrate facing the first, including regularly spaced, parallel conductive stripes comprising the anode electrode. These stripes are alternately covered by a first material luminescing in the red, a second material luminescing in the green, and a third material luminescing in the blue, the conductive stripes covered by the same luminescent material being electrically interconnected.

Figure 5:
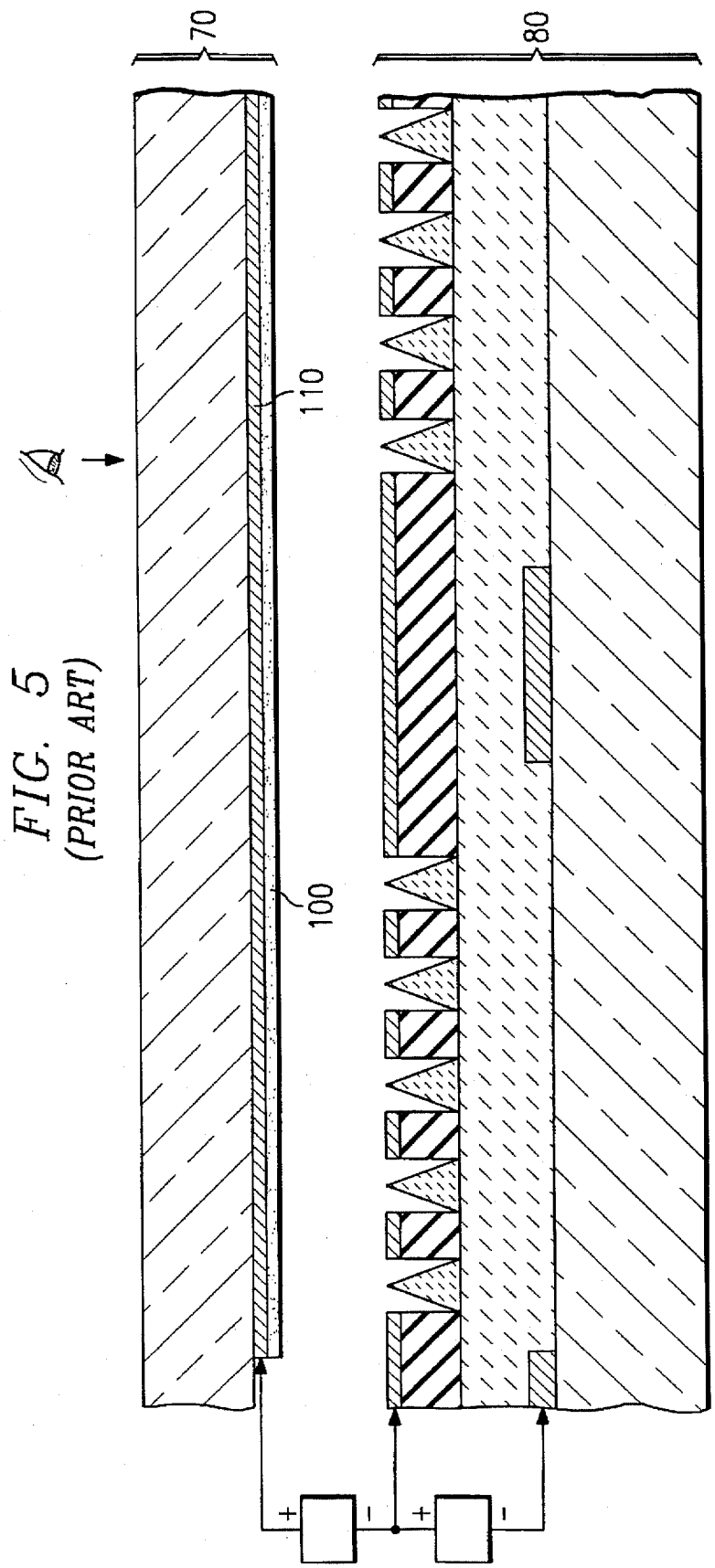
FIG. 5 is a prior art cross-sectional view of a portion of a field emission display having a single phosphor layer.

Today, a conventional FED 10 is manufactured by combining the teachings of the Spindt et al. ('799) and Clerc ('820) patents. A typical prior art FED color display is shown in FIG. 4. The typical FED comprises an anode 70, and an emitter 80. The anode 70 has red, green, and blue color phosphor stripes 90. The image created by the phosphor stripes is observed from the anode side which is opposite to the phosphor excitation, as indicated in FIG. 4. Alternatively, a typical prior art monochrome display, shown in FIG. 5, comprises anode 70, emitter 80, and a single phosphor coating 100 deposited over conductive film 110 of anode 70. To create a monochrome image a fixed voltage is applied on anode 70 and the voltage on emitter 80 is modulated to create gray-scale variations. It is to be noted and understood that true scaling information is not intended to be conveyed by the relative sizes and positioning of the elements of anode plate 70 and the elements of emitter plate 80 as depicted in FIGS. 4 and 5. For example, in a typical FED shown in FIG. 4 there are ten sets, or matrixes, of microtips 120 and there are three color stripes 90 per display pixel.

The process of producing each display frame using a typical trichromatic field emission display 10 includes applying an accelerating potential to the red anode stripes while sequentially addressing the row lines (gate electrodes) with the corresponding red video data for that frame applied to the column lines (cathode electrodes), switching the accelerating potential to the green anode stripes while sequentially addressing the rows lines for a second time with the corresponding green video data for that frame applied to the column lines, and switching the accelerating potential to the blue anode stripes while sequentially addressing the row lines for a third time with the corresponding blue video data for that frame applied to the column lines. This process is repeated for each display frame.

Returning to FIG. 3, FED 10 has an anode plate which has an electroluminescent phosphor coating facing an emitter plate. The phosphor coating creates the images displayed by the FED 10. FED's used for applications where the image on the FED need only be projected a few feet have an luminescence of around 120 ft-L (foot lamberts). Conversely, standard projection systems operate at a luminance of around 600 ft-L to properly project an image. The increased luminance needed in the preferred embodiment is obtained by increasing the voltage on the anode plate of FED 10. Using standard triode mode techniques commonly known in the industry, a ten-fold increase in voltage results in a one hundred-fold increase in luminance. Therefore the voltage of the anode does not have to be increased greatly above the standard 700 V level used for notebook computer applications to increase the standard luminance of the panel from 120-ft-L to 600 ft-L.

In the preferred embodiment the anode of FED panel 10 will be powered at a voltage below 5,000 V and will produce a luminance up to approximately 800 ft-L. In order to protect the cathode plate from potential damage caused by a high voltage breakdown between the anode and cathode, the spacing between the anode and cathode plates will be increased from 200 microns (commonly used in lap to computer applications) to less than 1 cm. The exact spacing between the anode and cathode plates is determined by the FED projection system application.

Increasing the voltage at the anode increases the heat created by panel 10. Therefore, in the preferred embodiment, the additional heat is mechanically dissipated by adding metal fins or frame to the structure of the FED panel.

Figure 7:
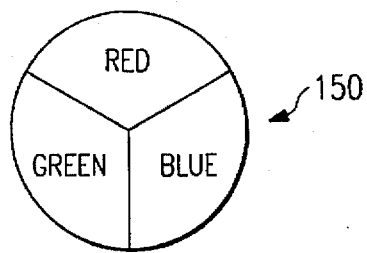
FIG. 7 is a front view of the color wheel shown in FIG. 6.

In a second embodiment of the invention, shown in FIG. 6, a field emission device projection system is constructed by creating an image on a monochrome FED 10 which is projected by a focusing lens 20 onto a large surface such as a screen or wall 30. FED 10 is coupled to projection system electronics 40 which receives an input signal on line 50 and then sends the data and control signals which are necessary to create a FED image to FED 10. In order to create a color image on screen 30, a color wheel 150 is disposed between FED 10 and focusing lens 20. As shown in FIG. 7, color wheel 150 is divided into three color sections. When motor 130, shown in FIG. 6, rotates color wheel 150, either a red, green or blue colored film section transforms the monochrome image projected by FED 10 into a color image which is then projected through lens 20 onto screen 30.

Motor 130 rotates the color wheel 150 at a speed synchronous to the frame rate which will place each of the three color portions of wheel 150 in front of FED 10 once during each frame. A typical frame rate is 60 Hz. During operation as the red portion of wheel 150 is placed between FED 10 and lens 20 a signal is sent on line 140 which will cause FED 10 to turn on and display the image for the red color. Next the FED 10 is turned off and the green portion of the wheel 150 is placed between FED 10 and lens 20. A signal is now sent on line 140 which will cause FED 10 to turn on and display the image for the green color. Finally, the FED 10 is turned off and the blue portion of the wheel 150 is placed between FED 10 and lens 20. A signal is now sent on line 140 which will cause FED 10 to turn on and display the image for the blue color. Even though the red, green, and blue images are each displayed sequentially during one frame, the user's eye integrates the three single color images and therefore the user sees only a full color image.

Figure 8:
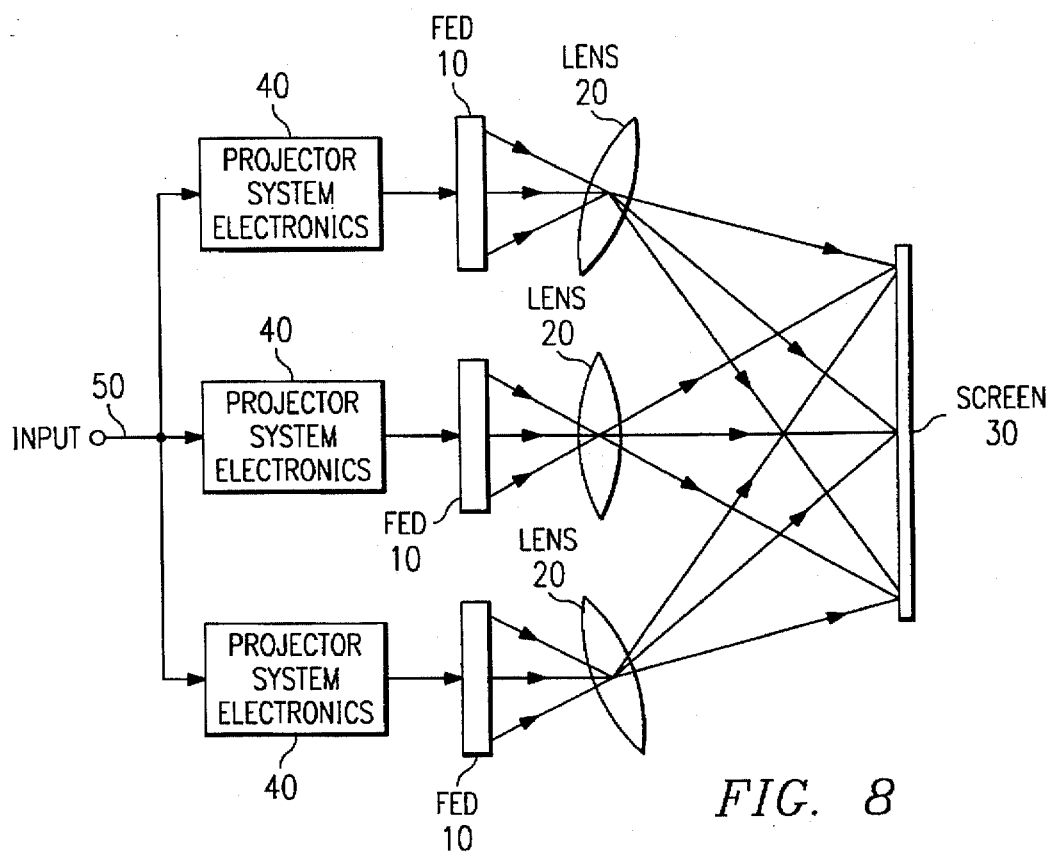
FIG. 8 is a third and fourth embodiment of a FED projection system.

In a third embodiment, shown in FIG. 8, a field emission device projection system is constructed by creating a red image on a first monochrome FED 10, a green image on a second monochrome FED 10, and a blue image on a third monochrome FED 10. These three images are then projected by three focusing lenses 20 onto a large surface such as a screen or wall 30. Each FED 10 is coupled to projection system electronics 40 which receives an input signal on line 50 and then sends the data and control signals which are necessary to create a FED image to FED 10. In order to create a color image on screen 30, the first monochrome FED contains only red phosphors and therefore projects the red image through a clear focusing lens 20 to screen 30. Simultaneously, the second monochrome FED, which has only green phosphors, and the third monochrome FED, which only has blue phosphors, projects the green and blue images through their respective clear focusing lenses 20 to screen 30. The result is that a full color image is displayed on screen 30.

Alternatively, the first, second and third monochrome FED's 10 of FIG. 8 may display the correct red, green and blue image using black/grey/white images which are projected through either a red, green or blue colored focusing lens 20. This configuration would also create a full color image on screen 30.

Figure 9:
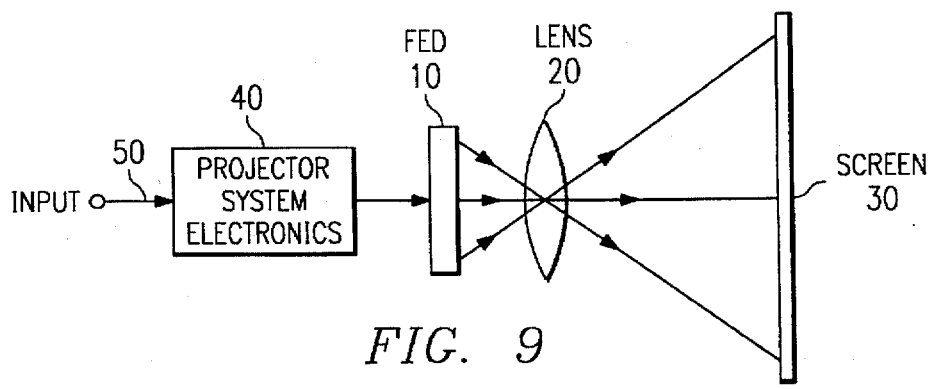
FIG. 9 is a fifth embodiment of a FED projection system.

In a fifth embodiment, shown in FIG. 9, a field emission device projection system is constructed by creating a color image on a FED 10 which is projected by a clear focusing lens 20 onto a large surface such as a screen or wall 30. FED 10 is coupled to projection system electronics 40 which receives an input signal on line 50 and then sends the data and control signals which are necessary to create a FED image to FED 10. In order to create a color image on screen 30, the FED 10 contains the red, green, and blue phosphor color stripes in its anode discussed above with reference to FIG. 4. Each of the three color stripes is sequentially activated and then deactivated once during each frame. The correct image is presented by the cathode for the each color as the red, green, and blue phosphor stripes are energized. The user's eye integrates the three images and so the user sees a full color image.

Figure 10:
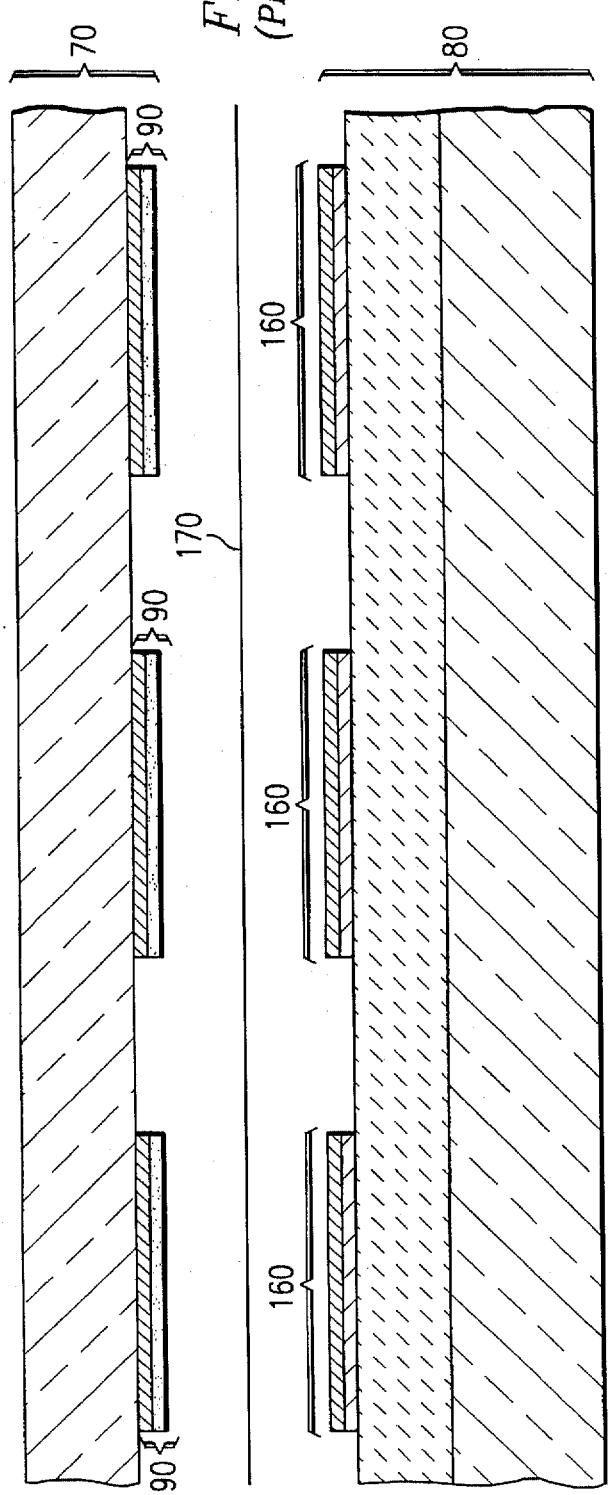
FIG. 10 is a prior art cross-sectional view of a portion of a field emission display having sub pixels in accordance with a sixth embodiment.

In yet another embodiment, the color FED 10 shown in FIG. 9 is physically modified. A standard FED employs the use of color stripes, as shown in FIG. 4. As each color stripe 90 is energized, it attracts electrons from each of the ten matrixes 120 which comprise one pixel. However, as shown in FIG. 10, it is also common to divide each pixel into three sub pixels 160 where each stripe 90 receives its electrons from its dedicated sub pixel 160 which is located directly opposite and facing color stripe 90. Sub pixels can be electrically isolated by leaving a vacuum space between the sub pixels or by depositing a dielectric between the sub pixels.

When FED 10 operates using this configuration, all color stripes 90 are continuously activated and cathode 80 controls whether electrons are released by the sub pixel which will energize the color phosphor stripes. The electron flow between sub pixels 160 and their respective color stripe 90 is self focusing when the anode 70 and cathode 80 are spaced apart the common distance of 200 microns used for lap top computer applications. However if anode 70 and cathode 80 are placed further apart to accommodate the need to increase the luminance, and therefore the voltage, of FED for projection system applications, then a focusing electrode or grid 170 may need to be placed between the anode 70 and cathode 80 as shown in FIG. 10. The focusing grid is a thin conductive film containing numerous perforations which is commonly known in the art. A focusing grid acts to direct the flow of electrons between the sub pixels 160 and color stripes 90.

Figure 11:
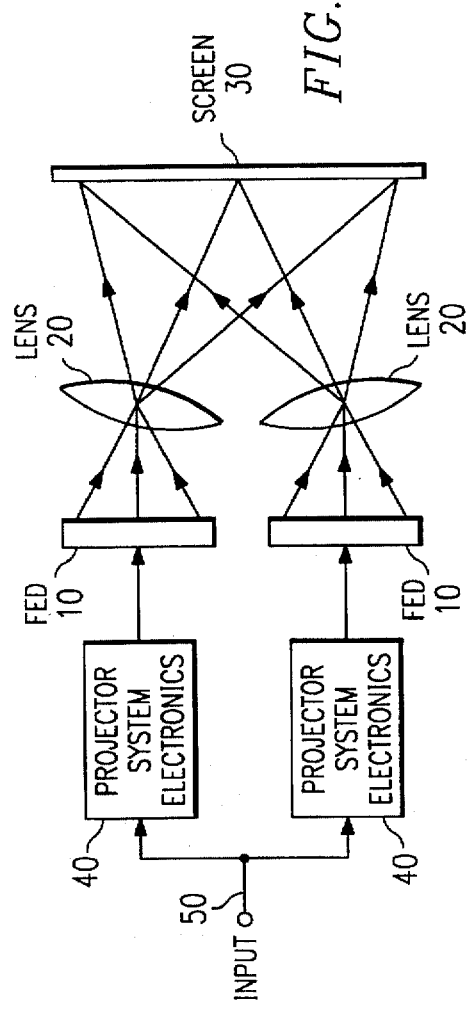
FIG. 11 is a seventh embodiment of a FED projection system.

In a seventh embodiment, shown in FIG. 11, a three dimensional field emission device projection system is created by using two FED's 10 and two lenses 20. This embodiment facilitates the implementation of standard three-dimensional display imaging techniques. One example is binocular stereoscopic imaging using polarization coding. This technique provides a true full-color three-dimensional display.

To view the scene, the full-color images on FED's 10 would be projected onto a screen 30. This projection system would project a first and second image so that they are substantially superimposed with respect to each other on the screen. The light from the first image is filtered to have a polarization orientation which is perpendicular to the light of the second image.

To see the desired three-dimensional effect, a viewer must wear special glasses with a pair of polarizing filters which each match a respective one of the polarizations of the light from the first and second images. Thus, with polarized lens glasses, each eye would look through a lens polarized at a 90° angle from the lens for the other eye and each eye therefore perceives only one of the stereoscopic images.

It is also possible to view a stereoscopic image by using two FED's 10 without the aid of special glasses. When two FED's 10 and two projection lenses 20 are used, and the convergence angle between the two images is chosen so that the projected images fall at the correct interpupillary distance, then stereoscopic viewing can also be realized.

Several other variations of the above would be understood by one skilled in the art and are considered to be within the scope of the present invention. For example, all FED projection systems described above can be configured as a front projection system, as shown in FIGS. 3, 6, 8, and 9, or as a rear projection system. Also, one set of projection system electronics 40 could provide the proper image information to all three FED's in FIG. 8

The use of a FED projection system, as disclosed herein, has numerous advantages. FED technology consumes less power and contains higher reliability electronics than current projection system technologies such as standard overhead projectors. Additionally, the FED projection system is approximately ¼ the volume of current projection systems such as BARCO-type CRT systems. Furthermore, FED projection systems are capable of interfacing to a lap top or a desktop size computer, as well as to a variety of other data and video sources. Screen displays up to 60" can be obtained while maintaining a picture brightness equal to or greater than current projection systems.

Still other advantages can be obtained with this invention. The FED projector system is capable of multimedia presentations. Therefore this system can display still images or video images. Also the system can display images in color or monochrome.

While the principles of the present invention have been demonstrated with particular regard to the structures and methods disclosed herein, it will be recognized that various departures may be undertaken in the practice of the invention. The scope of the invention is not intended to be limited

What is claimed is:

1. A field emission device projector apparatus for projecting a field emission device image onto a surface comprising:

circuitry responsive to an input signal for generating a field emission device display signal;

a first field emission device responsive to said display signal for displaying an image, said display coupled to a voltage source having a voltage less than 5,000 volts; and means for projecting said image onto said surface.

2. The apparatus in accordance with claim 1 wherein said projecting means comprises a lens system.

3. The apparatus in accordance with claim 1 wherein said first field emission device displays monochrome images.

4. The apparatus in accordance with claim 3 wherein said projecting means comprises a lens system.

5. The apparatus in accordance with claim 1 further comprising a synchronized color wheel, and wherein said first field emission device displays monochrome images.

6. The apparatus in accordance with claim 5 wherein said projecting means comprises a lens system.

7. The apparatus in accordance with claim 1 further comprising a second and a third field emission device, wherein said first field emission device displays a red image, said second field emission device displays a green image, and said third field emission device displays a blue image.

8. The apparatus in accordance with claim 7 wherein said projecting means comprises a lens system which projects said red, green and blue images of said first, second and third field emission devices.

9. The apparatus in accordance with claim 1 wherein said first field emission device displays color images.

10. The apparatus in accordance with claim 9 wherein said projecting means comprises a lens system.

11. The apparatus in accordance with claim 1 wherein said first field emission device's cathode has each pixel divided into a first, a second, and a third independent sub-pixel, said first sub-pixel energizes red phosphor of said pixel, said second sub-pixel energizes blue phosphor of said pixel, and said third sub-pixel energizes green phosphor of said pixel.

12. The apparatus in accordance with claim 11 wherein said projecting means comprises a lens system.

13. The apparatus in accordance with claim 1 further comprising a second and a third field emission device, wherein said first, second and third field emission device displays monochrome images.

14. The apparatus in accordance with claim 13 wherein said projecting means comprises a lens system having a red first lens, a blue second lens, and a green third lens for projecting the monochrome images on said first, second, and third field emission devices.

15. A method of projecting a field emission device image onto a surface comprising the steps of:

applying a voltage of less than 5,000 volts to a field emission device;

displaying a color image on said field emission device by energizing red, green, or blue sub pixels; and projecting said image onto said surface separated.

16. The method of claim 15 wherein said image is projected onto said surface through the use of a lens system.

17. A method of projecting a field emission device image onto a surface comprising the steps of:

applying a voltage of less than 5,000 volts to a field emission device;

displaying a monochrome image on said field emission device; and projecting said image onto said surface.

18. The method of claim 17 wherein said image is projected onto said surface through the use of a lens system.

19. A method of projecting an image comprising the steps of:

applying a voltage of less than 5,000 volts to a field emission device;

displaying a monochrome image on said field emission device;

projecting said image through a color wheel; and projecting said image onto a surface separated from said device.

20. The method of claim 19 wherein said image is projected onto said surface through the use of a lens system.

21. A method of projecting a field emission device image onto a surface comprising the steps of:

applying a voltage of less than 5,000 volts to a first, second, and third field emission device;

displaying on said first field emission device a red image, displaying on said second field emission device a green image, and displaying on said third field emission device a blue image; and projecting said images onto said surface.

22. The method of claim 21 wherein said image is projected onto said surface through the use of a lens system.

23. A method of projecting a field emission device image onto a surface comprising the steps of:

applying a voltage of less than 5,000 volts to a field emission device;

displaying a color image on said field emission device; and projecting said image onto said surface.

24. The method of claim 23 wherein said image is projected onto said surface through the use of a lens system.

25. A field emission device projector apparatus for projecting a three dimensional image onto a single surface comprising:

circuitry responsive to an input signal for generating a first and a second field emission device display signal, said first and second signals each providing one half of the information needed for said three dimensional display image;

a first and a second field emission device responsive respectively to said first and second signal for displaying a first and second image, said first and second field emission device coupled to at least one voltage source having a voltage less than 5,000 volts; and means for projecting said images coextensively onto said single surface; wherein said three dimensional image is created on said single surface.

26. The apparatus of claim 25 wherein said projecting means comprises a lens system.

* * * * *